(12) United States Patent
Baumann et al.

(10) Patent No.: US 8,356,687 B2
(45) Date of Patent: Jan. 22, 2013

(54) VEHICLE OCCUPANT PROTECTION METHOD AND APPARATUS

(75) Inventors: Karl-Heinz Baumann, Bondorf (DE); Till Heinrich, Stuttgart (DE); Clark Ruedebusch, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 151 days.

(21) Appl. No.: 12/809,965

(22) PCT Filed: Dec. 6, 2008

(86) PCT No.: PCT/EP2008/010367
§ 371 (c)(1),
(2), (4) Date: Sep. 13, 2010

(87) PCT Pub. No.: WO2009/080193
PCT Pub. Date: Jul. 2, 2009

(65) Prior Publication Data
US 2011/0011664 A1    Jan. 20, 2011

(30) Foreign Application Priority Data
Dec. 22, 2007  (DE) .......................... 10 2007 062 599

(51) Int. Cl.
*B62D 21/15*  (2006.01)
(52) U.S. Cl. .................. 180/274; 180/232; 180/282
(58) Field of Classification Search .............. 180/274, 180/232, 273, 378–380; *B62D 21/15*
See application file for complete search history.

(56) References Cited

U.S. PATENT DOCUMENTS

| | | | |
|---|---|---|---|
| 2,929,637 A * | 3/1960 | Papacosta | 280/29 |
| 3,814,459 A * | 6/1974 | Eckels | 280/753 |
| 4,703,827 A * | 11/1987 | Vollmer et al. | 180/232 |
| 4,795,189 A * | 1/1989 | Vollmer et al. | 280/801.1 |
| 4,823,905 A * | 4/1989 | Piech | 180/274 |
| 5,154,253 A * | 10/1992 | Vollmer | 180/274 |
| 5,476,151 A * | 12/1995 | Tsuchida et al. | 180/274 |
| 5,518,271 A * | 5/1996 | Bell | 280/806 |
| 5,746,467 A * | 5/1998 | Jesadanont | 296/68.1 |
| 5,810,417 A * | 9/1998 | Jesadanont | 296/68.1 |
| 6,158,538 A | 12/2000 | Botzelmann et al. | |
| 6,170,865 B1 * | 1/2001 | Barron | 280/735 |
| 6,193,296 B1 * | 2/2001 | Motozawa et al. | 296/68.1 |
| 6,227,597 B1 * | 5/2001 | Swann et al. | 296/68.1 |

(Continued)

FOREIGN PATENT DOCUMENTS

DE          43 31 900 A1     3/1994
(Continued)

OTHER PUBLICATIONS

International Search Report (Form PCT/ISA/210) with partial English translation, along with Forms PCT/ISA/220 and PCT/ISA/237 (Twelve (12) pages).

*Primary Examiner* — Paul N Dickson
*Assistant Examiner* — Nicole Verley
(74) *Attorney, Agent, or Firm* — Crowell & Moring LLP

(57) ABSTRACT

A vehicle has a crash detection device for detecting a crash that introduces a force acting in an effective direction into the vehicle. An acceleration device directly or indirectly cooperates with the crash detection device to absolutely accelerate at least one partial mass of the vehicle against the effective direction in which the force is introduced in case of a crash.

16 Claims, 5 Drawing Sheets

U.S. PATENT DOCUMENTS

| | | | |
|---|---|---|---|
| 6,454,351 B2 * | 9/2002 | Motozawa et al. | 297/216.16 |
| 6,464,275 B2 * | 10/2002 | Laurent et al. | 296/35.2 |
| 6,574,540 B2 * | 6/2003 | Yokota et al. | 701/45 |
| 6,604,771 B2 * | 8/2003 | Motozawa et al. | 296/68.1 |
| 6,607,212 B1 * | 8/2003 | Reimer et al. | 280/735 |
| 6,655,230 B1 * | 12/2003 | Rupp et al. | 74/512 |
| 6,676,709 B1 * | 1/2004 | de la Asuncion | 280/784 |
| 6,851,505 B2 * | 2/2005 | Motozawa et al. | 180/274 |
| 7,159,923 B2 * | 1/2007 | Rajasingham | 296/68.1 |
| 7,552,943 B2 * | 6/2009 | Pal et al. | 280/751 |
| 2002/0079689 A1 * | 6/2002 | Motozawa et al. | 280/806 |
| 2003/0184124 A1 | 10/2003 | Yamaguchi | |
| 2005/0077746 A1 | 4/2005 | Rajasingham | |

FOREIGN PATENT DOCUMENTS

| | | |
|---|---|---|
| DE | 197 38 620 C1 | 12/1998 |
| DE | 103 45 749 A1 | 4/2005 |
| DE | 103 57 015 A1 | 6/2005 |

* cited by examiner

VEHICLE OCCUPANT PROTECTION METHOD AND APPARATUS

This application is a national stage of PCT International Application No. PCT/EP2008/010367, filed Dec. 6, 2008, which claims priority under 35 U.S.C. §119 to German Patent Application No. 10 2007 062 599.7, filed Dec. 22, 2007, the entire disclosure of which is herein expressly incorporated by reference.

BACKGROUND AND SUMMARY OF THE INVENTION

The present invention relates to a vehicle and to a method for reducing loading of a vehicle occupant in the case of a crash.

In order to reduce a danger of injury for vehicle occupants in the case of a crash, vehicles can be designed in such a manner that the force introduction on the respective occupants takes place as long as possible on the one hand and that a certain maximum force is thereby not exceeded on the other hand. The problem is hereby that, in the case of a crash with a high vehicle speed, there is no time to slowly carry out the force increase at the occupant. At the same time, a fast force increase is disproportionately uncomfortable for the occupants with cases of a crash with a low vehicle speed. Vehicles are accordingly designed regularly with a compromise with an average vehicle speed in the case of a crash.

German patent document DE 103 57 015 A1 discloses a vehicle which has a force transfer element in an engine chamber. This can remove at least the engine mass early from the energy-absorbing force path (crush zone), whereby the time available for the force build-up at the occupant and for the deceleration of the vehicle can be prolonged.

In German patent document DE 197 38 620 C1 an electric vehicle has a traction battery that is arranged in a battery trough, and can be displaced in the longitudinal vehicle direction along at least one sliding tube. In the case of a crash, the large mass of the traction battery can thereby be braked over a longer path of deceleration, which reduces the danger of a damage of the traction battery.

Published U.S. Patent Application No. 2003/0184124 A1 discloses a vehicle whose front region is designed in such a manner that, in the case of a crash, a crush zone arranged in front of an engine is first crushed, and that, with further deformation, a support frame behind the engine bends and thereby enables an energy-absorbing rotation around a transverse axis of the vehicle.

One object of the present invention is to provide an improved embodiment for a vehicle or for a method of the above-mentioned type, which is especially distinguished by an improved occupant protection in the case of a crash.

This and other objects and advantages are achieved by the crash protection method and apparatus according to the present invention which is based on the general idea to accelerate a partial mass of the vehicle absolutely (that is, not only relative to the remaining vehicle) in one direction in particular in a direction which is opposed to an effective direction in which a force introduction into the vehicle is expected in the case of a crash. In other words, with a frontal crash during a forward drive of the vehicle, the force acting on the vehicle is opposed to the drive direction of the vehicle and effects as a result a deceleration of the vehicle. According to the invention, a partial mass of the vehicle is now accelerated opposed to this force, acting in an effective direction that is in the drive direction of the vehicle, and namely in an absolute manner.

The absolute acceleration of the partial mass means that the partial mass that has the same speed as the remaining vehicle at the start of the case of the crash, is additionally accelerated in the current movement direction of the vehicle in addition with regard to the environment. This absolute acceleration thus increases the kinetic energy of the partial mass. By the acceleration of the partial mass, a repercussion is however generated which is supported at the remaining vehicle, which consequently has the same direction as the force introduction into the vehicle which is expected in the case of a crash. The suggested acceleration of the partial mass thus leads to a force introduction into the vehicle which delays the vehicle. This effects a force introduction onto the vehicle occupants.

With the help of a corresponding crash detection device, it is possible to detect a crash (that is, a collision of the vehicle with an obstacle) at a time when the expected force introduction at the vehicle due to the crash is not yet (or not yet completely) built up. The vehicle can therefore be decelerated at an earlier time with the help of the acceleration of the partial mass, in order to prolong the time which is altogether available for decelerating the vehicle. The respective crash detection device can for example detect the imminent crash, even before the vehicle contacts the respective obstacle.

The deceleration of the vehicle caused by the acceleration of the partial mass additionally causes the vehicle occupants to be already sensed by corresponding restraint systems, as e.g., a safety belt, whereby in particular a so-called belt slack is removed from the restraint system. This measure makes the introduction of larger deceleration forces more bearable for the occupants.

A sensor can also be used as a crash detection device, which only detects the crash from the contact of the vehicle with a collision object, e.g., an acceleration sensor. The acceleration of the partial mass is then naturally only possible from the crash detection.

The invention is in principle based on the consideration that the deceleration characteristic in the case of a crash can be influenced by the use of the repercussion during the acceleration of the respective partial mass. This is in principle possible for all six degrees of freedom of the vehicle, that are the translations in the three directions and the rotation around the three axes.

For realizing this principle, the vehicle is equipped with an acceleration device, which cooperates with a corresponding crash detection device. The acceleration device can accelerate absolutely in dependence on the respective case of the crash, namely against the effective direction of the force introduction, which is expected in the respective case of a crash. In particular, the engine of the vehicle constitutes a partial mass suitable for such acceleration. A fuel tank or, for example with an electric vehicle, a traction battery are also suitable. A displaceable mass in a longitudinal beam is however also conceivable, wherein a smaller mass by means of acceleration, also a larger end speed with a longer path can also be compensated.

Corresponding to an advantageous embodiment, a holding device cooperating with the crash detection device can be provided, with the help of which the respective partial mass can be fixed to the remaining vehicle during a normal vehicle operation, and which can release the respective partial mass relative to the remaining vehicle in the case of a crash. The engine can for example be fixed in a rear vehicle position with the help of the holding device, so that it can be accelerated to the front in the case of a crash.

Further important characteristics and advantages of the invention result from the dependent claims, the drawings and from the associated description of the figures by means of the drawings.

It is apparent that the above-mentioned characteristics, which still will be explained in the following, can be used not only in the respectively given combination but also in other combinations or on their own without leaving the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1A:
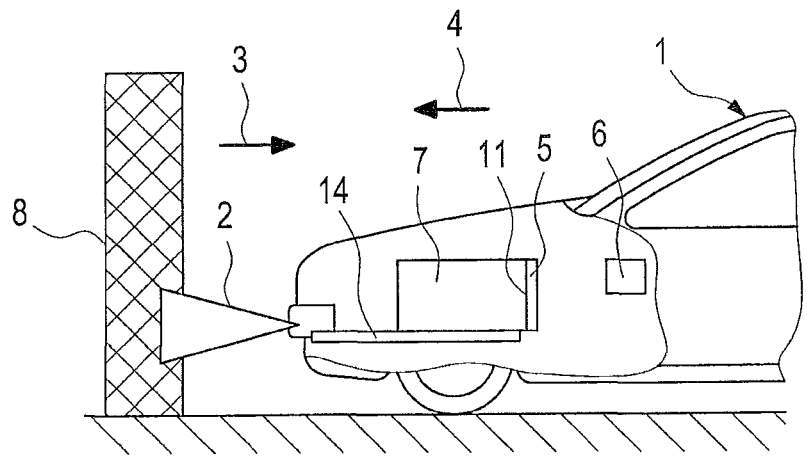
FIGS. 1a to 1c are respective highly simplified side views of a vehicle with different phases in the case of a crash.
Figure 1B:
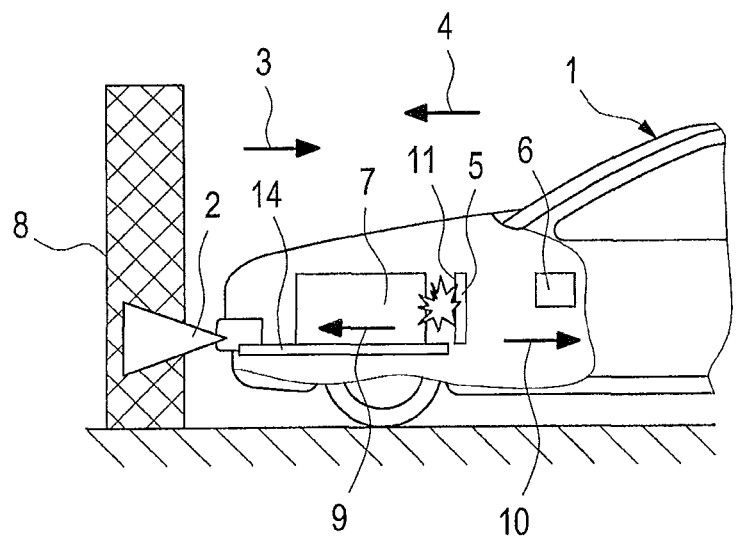
Figure 1C:
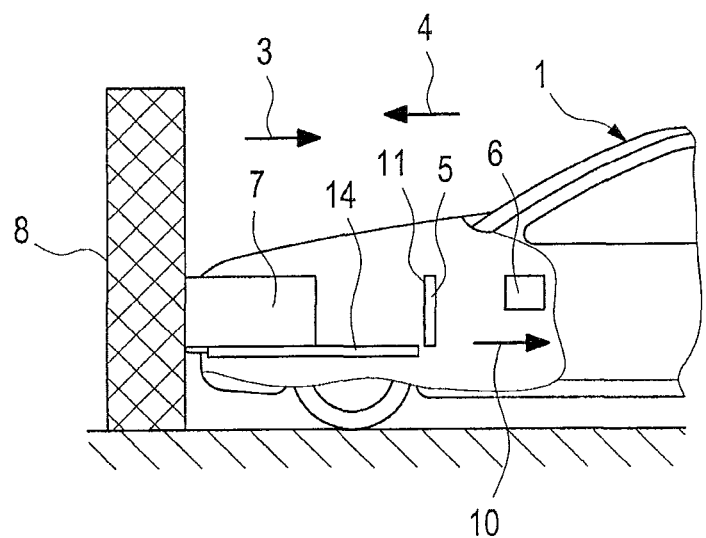
Figure 2:
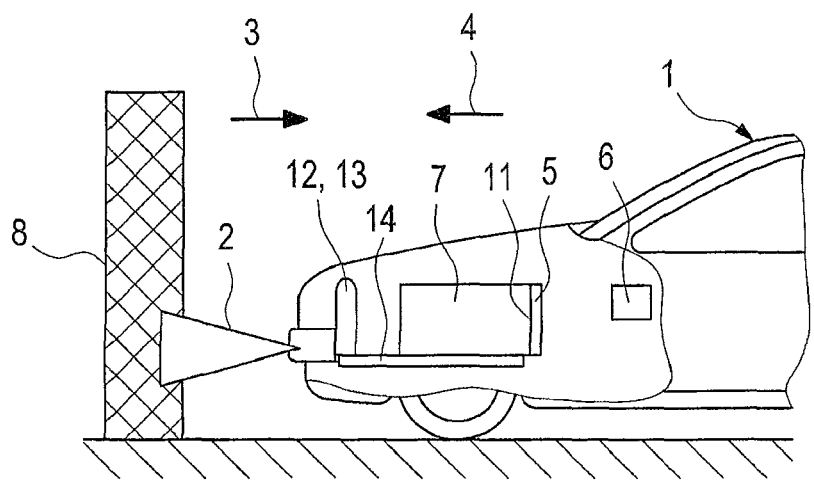
FIGS. 2a to 2d correspond to FIG. 1, but with another embodiment.
Figure 2:
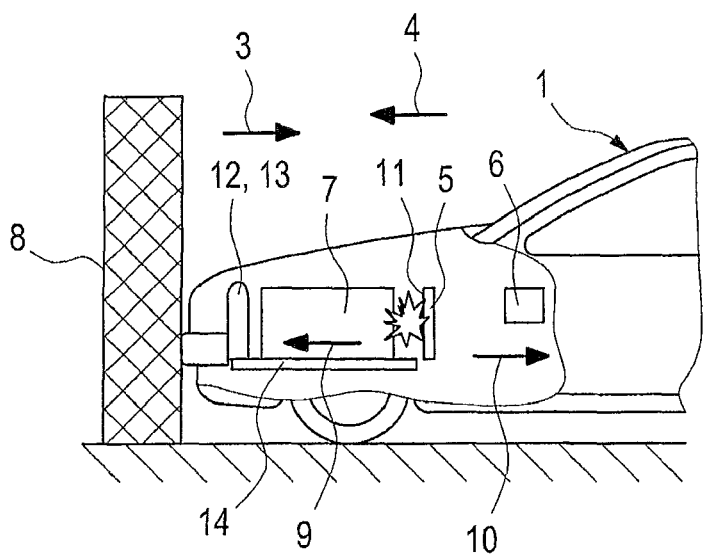
Figure 2:
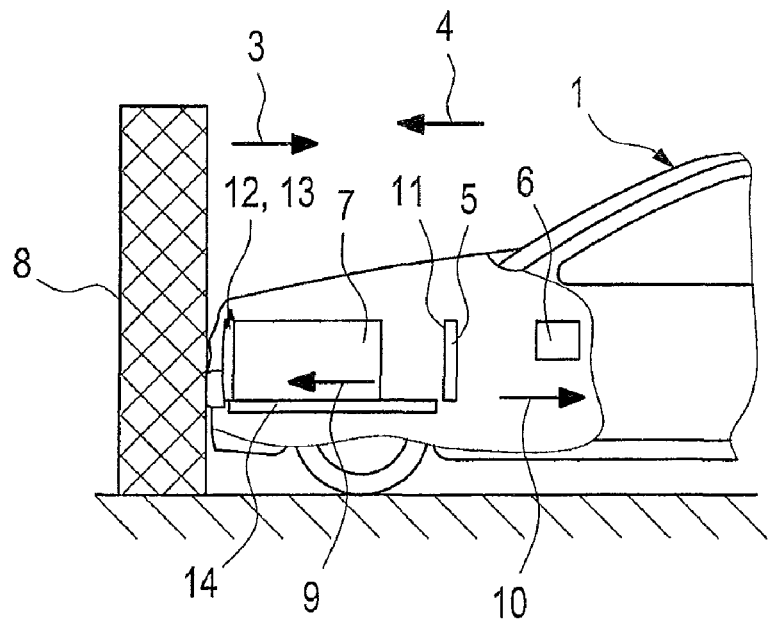
Figure 2:
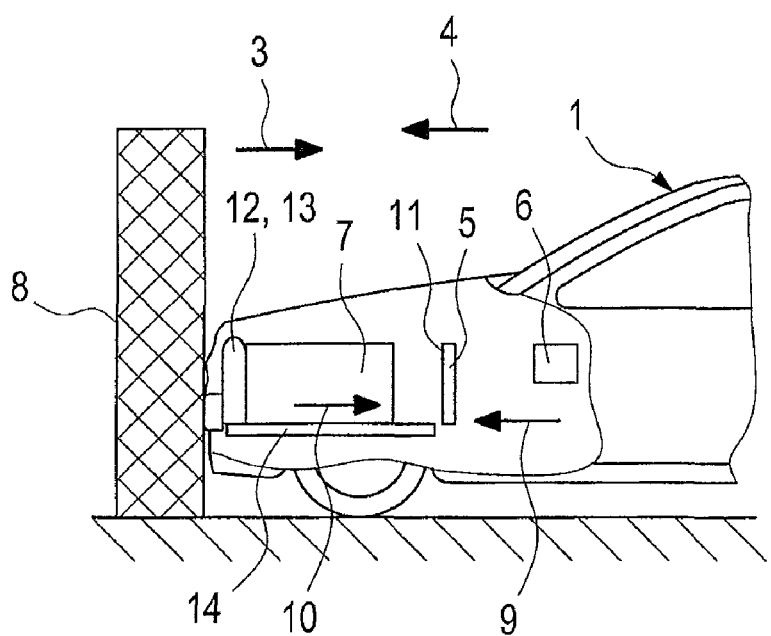
Figure 3:
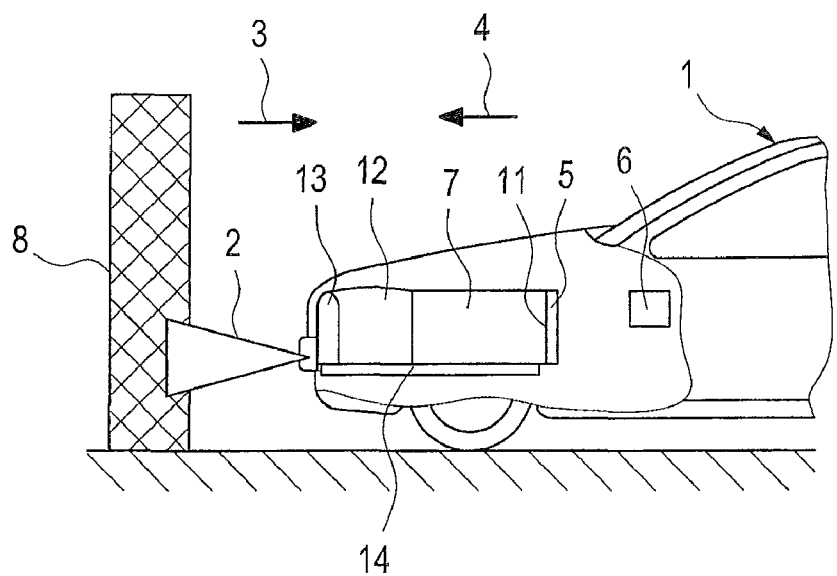
FIGS. 3a to 3d correspond to FIG. 1, but with a further embodiment.
Figure 3:
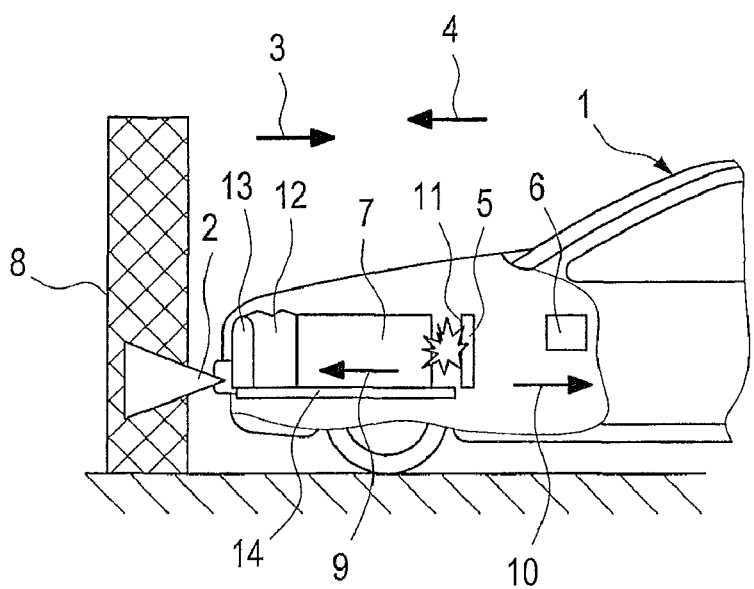
Figure 3:
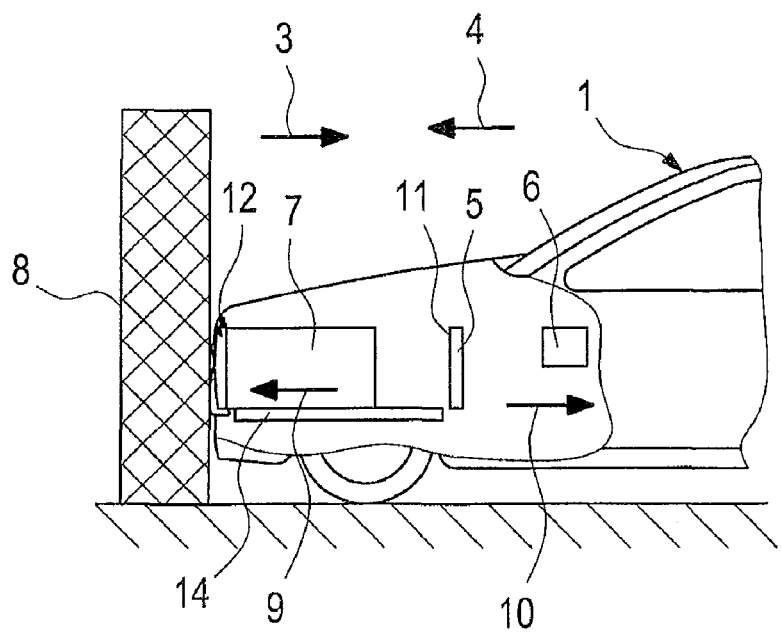
Figure 3:
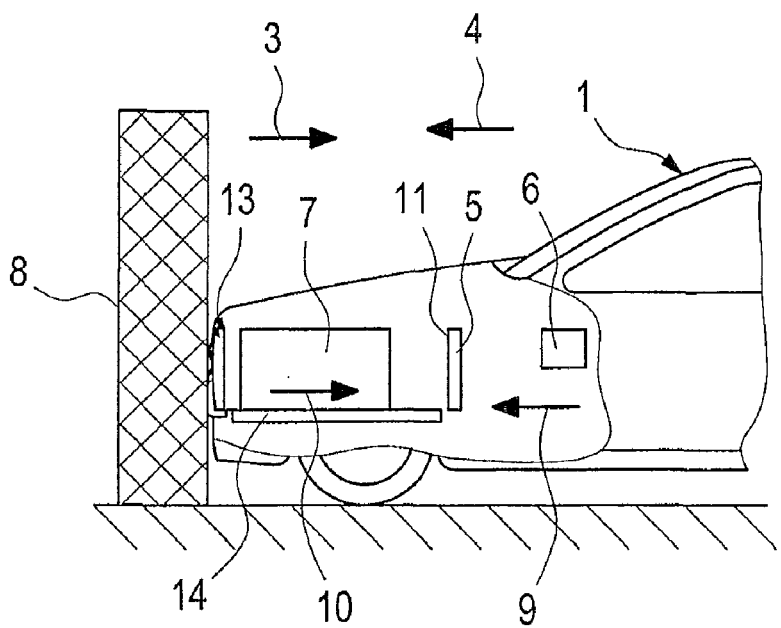

Corresponding to FIGS. 1 to 3, a vehicle 1 (of which only a front region is shown) can have a crash detection device 2, which operates for example by means of a distance sensor system. The crash detection device 2 can detect a case of a crash, which will introduce a force into the vehicle 1 in an effective direction 3. The effective direction 3 of this expected force introduction is thereby opposed to a current movement or drive direction 4 of the vehicle 1. The vehicle 1 further has an acceleration device 5, which cooperates with the crash detection device 2 in a suitable manner. A control 6 can for example be provided for the coupling of the devices 2, 5. The acceleration device 5 is designed in such a manner that it can at least accelerate a partial mass 7 of the vehicle 1 in the case of a crash against the effective direction 3, that is, in the movement direction 4 in an absolute manner.

The crash detection device 2 detects for example the imminent collision of the vehicle 1 with an obstacle 8 according to FIG. 1a. The control 6 can actuate the acceleration device 5 depending on the expected magnitude of the force introduced into the vehicle 1 due to the crash. With a smaller relative speed between the vehicle 1 and the obstacle 8, the control 6 does not actuate the acceleration device 5; rather, it actuates the acceleration device 5 only from a predetermined relative speed, which can for example be 30 km/h.

According to FIG. 1b, the activated acceleration device 5 effects an acceleration of the partial mass 7 against the effective direction 3 of the force introduction. The movement direction of the accelerated partial mass 7 relative to the vehicle 1 is indicated by an arrow 9. In order to be able to absolutely accelerate the partial mass 7 relative to the vehicle 1, kinetic energy has to be introduced into the partial mass 7. The reaction which necessarily results thereby leads to a force introduction into the vehicle 1 corresponding to the arrow 10. This force introduction 10 of the movement direction 9 of the partial mass 7 can be seen in an opposed manner, that is, in the same direction as the effective direction 3 of the force introduction expected due to the case of the crash. It is noteworthy that this force introduction is already realized at a time according to FIG. 1b when the vehicle 1 has not yet contacted the obstacle 8. The vehicle 1 can thus already be decelerated before the force introduction expected due to the case of the crash can build up at the vehicle 1.

FIG. 1c shows a state at which the actual force introduction takes place due to the crash. It is noteworthy that the deceleration of the accelerated partial mass 7 takes place in this embodiment by the collision with the obstacle 8, consequently essentially without repercussion on the vehicle 1 and its occupants. With this embodiment, an enduring separation of the partial mass 7 from the vehicle 1 is realized, so that the masses do not influence each other anymore. The accelerated partial mass 7 leaves the vehicle system.

The accelerated partial mass 7 in the shown examples is preferably an engine of the vehicle 1, which has a comparatively large mass. The acceleration device 5 can for example operate by means of at least one passive drive device (such as, for example, a tensioned mechanical or pneumatic spring). Additionally or alternatively, the acceleration device 5 can operate with at least one active drive unit, as e.g., with an electrical or electromagnetic or hydraulic or pneumatic or pyrotechnical actuator.

The vehicle 1 can furthermore be equipped with a holding device 11, which cooperates with the crash detection device 2 directly or indirectly via the control 6. The holding device 11 fixes the partial mass 7 to the remaining vehicle during a normal vehicle operation. In the case of a crash, the holding device 11 can release the respective partial mass 7 relative to the remaining vehicle 1. Depending on the design of the acceleration device 5, the holding device 11 can also form a component of the acceleration device 5.

Corresponding to FIGS. 2 and 3, the vehicle 1 can also be equipped with an absorption device 12, with the help of which the accelerated partial mass 7 can be braked relative to the remaining vehicle 1. With these embodiments, the movement-type decoupling between the partial mass 7 and the remaining vehicle 1 takes place only temporarily. The absorption device 12 can thereby in particular be designed in such a manner that it brakes the accelerated partial mass 7 in a dampened or spring-loaded manner. The braking or the absorption of the accelerated partial mass 7 takes place within the crash at a time when the reaction forces resulting during braking can essentially be absorbed by the obstacle 8, so that no additional acceleration of the vehicle 7 results.

FIG. 2a again shows the start of a crash; that is, a time when the crash detection device 2 detects the imminent case of the crash. At the time of FIG. 2b, the acceleration device 5 effects the acceleration of the partial mass. At the time of FIG. 2c, the absorption device 12 absorbs the kinetic energy of the partial mass.

Additionally or alternatively, the vehicle 1 can be equipped with a counter acceleration device 13. This counter acceleration device 13 can thereby particularly be integrated in the absorption device 12.

The counter acceleration device 13 is designed in such a manner that the accelerated partial mass 7 can now be again accelerated in the opposite direction, that is in the effective direction 3. This counter acceleration can be dimensioned in such a manner that the partial mass 7 subsequently rests relative to the vehicle 1. The counter acceleration can also be larger, so that the partial mass 7 subsequently moves against the vehicle 1. This state is shown in FIG. 2d. The counter acceleration of the partial mass 7 itself takes place at a time when the reaction forces that result necessarily are already absorbed by the obstacle 8. By means of the counter acceleration of the partial mass 7, the kinetic energy of the partial mass 7 can particularly be used for increasing the deceleration force affecting the vehicle. The kinetic energy of the partial mass 7 which is then directed against the vehicle can be absorbed by corresponding devices by the vehicle 1, whereby the force introduction into the vehicle 1 increases.

For the force transfer between the partial mass 7 moving against the vehicle 1 and the vehicle 1 itself, a force transfer device 14 can be provided. Such a force transfer device 14 (which can in principle also be present with the embodiment shown in FIG. 1), transfers the kinetic energy of the partial mass 7 to the vehicle 1, whereby this is braked. As this counter acceleration of the partial mass 7 and its force transfer to the vehicle 1 can in particular be realized at a time at which the force introduction released by the crash has not yet built up completely, the vehicle 1 can be braked earlier, which increases the time available for braking the vehicle and reduces the loading of the occupants.

Altogether, the force characteristic or the deceleration characteristic can in this case be designed in such a manner that a comparatively high force introduction can be realized, which can then be kept evenly on a comparatively high level for a comparatively long time, whereby a relative even deceleration of the vehicle 1 can be realized. This is particularly favorable for the vehicle occupants. The early force introduction particularly effects an early activation of restraint systems, such as safety belts, whereby the force introduction can be endured in a better manner by the respective occupant.

With the embodiment shown in 2, the absorption device first cooperates with the partial mass 7 in a temporally delayed manner, so that it temporarily moves completely independently of the remaining mass of the vehicle 1. If the counter acceleration unit 13 is provided, the absorption device 12 can be foregone in principle with the embodiment shown in FIG. 2.

In contrast, FIG. 3 shows an embodiment in which the absorption device 12 cooperates with the partial mass 7 from the start. A path-dependent deceleration or braking of the partial mass 7 can be realized thereby. FIG. 3d again shows a version in which the counter acceleration device 13 accelerates the partial mass 7 in the opposite direction. The excess kinetic energy introduced thereby into the partial mass 7 can again be transferred to the vehicle 1 by means of the force transfer device 14.

Corresponding to a particularly advantageous embodiment, the crash detection device 2 can be designed in such a manner that it can detect and distinguish different effective directions 3 of forces. The acceleration device 5 can advantageously be designed in such a manner that it can accelerate the respective partial mass 7, in particular different partial masses 7, in different directions. In particular in connection with the control 6, by means of which the acceleration device 5 cooperates indirectly with the crash detection device 2, it can now be provided that the acceleration device 5 makes the direction in which it accelerates the respective partial mass 7 dependent on the direction, which is detected by the crash detection device 2 as the effective direction 3 for the force introduction to be detected.

In another embodiment, it can be provided that the crash detection device 2 is designed to detect the magnitude of the force introduction expected in the vehicle 1 in the case of a crash. The acceleration device 5 can optionally be designed in such a manner that it can provide the respective partial mass 7 with accelerations having different magnitudes. It is hereby particularly possible that the acceleration device 5 makes the magnitude of the acceleration of the respective partial mass 7 dependent on the expected magnitude of the force introduced into the vehicle in the case of a crash. Thus, at least two additional crash states can be distinguished from one another. In the case of a crash with a low vehicle speed, an actuation of the acceleration device is omitted. With an average vehicle speed, the acceleration device 5 is accessed for accelerating the partial mass 7 with a relatively small acceleration. With a high vehicle speed, the partial mass 7 can then be driven with a relatively large acceleration in the case of a crash. It is apparent that further gradings are also conceivable.

Corresponding to another embodiment, the control 6 can actuate at least one of the following devices dependent on the magnitude of the expected force introduction, namely the acceleration device 5, the holding device 11, the absorption device 12, the counter acceleration device 13 and the force transfer device 14.

The system according to the invention for improving the vehicle occupant safety thus operates with a division of the vehicle mass and the different acceleration or deceleration of these masses that can be achieved thereby. The temporal distribution of the speed reduction can be influenced by this, whereby an earlier and/or stronger use of the deceleration can be realized at the remaining vehicle 1 or at the occupants. An early restraint of the occupants (e.g., via corresponding restraint systems) can thus be enabled or favored with a temporal energy reduction which is as homogenous as possible.

The invention improves the deceleration impulse during a vehicle crash and thereby reduces the occupant loading. It is the aim with the design of the acceleration of the partial mass 7 to have an occupant deceleration which is as rectangular as possible with a deceleration plotted over time. The shoulders, in particular the ascending shoulder, is thereby adapted to biomechanical aspects with regard to its incline. The vehicle deceleration with an ideal direct restraint of the occupants to the vehicle 1 should also be nearly rectangular for this purpose. As the restraint of the vehicle occupants to the vehicle is usually not ideal (that is not direct, but only indirect), an initial excess of the vehicle deceleration characteristic can also be advantageous.

The partial mass 7 that can be accelerated with the help of the acceleration device is a large mass if possible. The acceleration device 5 should simultaneously—depending on the case of the crash—realize an acceleration of the partial mass 7 that is as large as possible. Suitable separable partial masses 7 are for example the engine of the vehicle, an energy store, e.g., a battery or a tank, body shell parts, with utility vehicles also cabin components.

The acceleration device 5 (and if present the counter acceleration device 13) conveniently operates with pyrotechnics (e.g., gas generators), pneumatics (e.g., pressurized air or pressurized gas stores), hydraulics, whereby direct response behavior and translations are possible, electrical actuators (e.g., engines), or mechanical actuators (e.g., springs that can be disengaged). Passive drive elements are e.g., pneumatic devices such as pressurized air stores, pressurized gas stores, hydraulic devices which enable a direct response and translations, and mechanical devices as e.g., springs, levers and deflection devices.

The holding device 11, with the help of which the partial mass 7 can be released in a distinct manner, can have engine mounts, power train parts, exhaust gas parts and the like. These separations can thereby be designed in a irreversible or reversible manner. With batteries, pyrofuse, that is fuses operating in a pyrotechnical manner can be provided, furthermore separation locations for batteries can be provided as e.g., plugs or predetermined breaking points Corresponding displaceable masses can also be accommodated in longitudinal beams of the vehicle 1.

Adaptations to the anticipated accident course are suitable as actuation strategies, wherein the cooperation of acceleration device 5, holding device 11, absorption device 12, counter acceleration device 13 and force transfer device 14 has to be considered. The actuation time for the acceleration device 12 can in particular be chosen before, during or after the time of the contacting of the vehicle 1 with the respective obstacle 8.

If the partial mass 7 that can be accelerated with the help of the acceleration device 5 can be coupled to the vehicle 1 as in FIGS. 2 and 3, several connection forms can be distinguished that are different and that can possibly be combined with each other. Pulse transmitters are in principle possible via elastic or plastic impacts. Thus, an energy absorption, e.g., due to the conversion of kinetic energy to deformation work, as a dampened connection, can for example be advantageous with a plastic impact. It can also be advantageous to provide a larger pulse transfer via an elastic impact, and thus possibly to use a deformation path that has not been used for a longer distance, for braking the vehicle, and thus also the occupants.

For the conversion, the following principles and their combinations can be used. Form-fit, force-fit, electromagnetic interaction, gravitation, adhesion, cohesion, e.g., the suction cup principle, where plane surfaces, preferably with a seal, e.g., in the form of a sealing lip and/or of a fluid film can abut directly. Deformation of matter (e.g., cooler as a deformation element) compression of matter (e.g. air pressure in tires) deflection of masses, possibly with pulse energy transfer to another mass, during the release and/or separation and/or with the reconnection. Water can for example exit laterally from the coolant water container during the absorption, wherein basically all six degrees of freedom are available, that is, also rotations, and the atomization and comminution of masses, in which the release or separation and/or with the reconnection, in particular, water could be atomized to a water mist, possibly in combination with a direction reversal, e.g., upwardly, in order to reduce effects on the environment, or to bring the respective mass out of an undesired region. It is further possible in principle to use the air resistance for braking, which can be achieved in that the respective mass is distributed on a larger surface or on a larger volume.

Different constructions are conceivable for the absorption device 12, which can for example operate in a passive manner, in particular mechanically, e.g., via stops, wedging, possibly with deformations, e.g., of a cooler or an elongated hole, within which the partial mass 7 is displaced, by means of a possible expandable wire rope and the like, by deflection, levers, springs, possibly with energy absorption. Pneumatic solutions are also conceivable, e.g., via compression of gas containers, or hydraulic solutions, e.g., by pressing a fluid container. Actively operating absorption devices can comprise mechanical solutions, e.g., levers, latch bolts, wedge brakes (mechanical and electrical), or comprise electrical solutions, e.g., a mechanically and electrically operable wedge brake. Magnetic solutions are further also conceivable, e.g., latch bolts moved by electromagnets. Magnetic material can also be held magnetically, mainly with small distances. Pneumatic solutions with pressurized air or pressurized gas stores and hydraulic solutions are also conceivable, wherein hydraulic solutions enable a direct approach and translations. Pyrotechnical solutions are further also conceivable, in particular gas generators.

For the reconnection of the accelerated partial mass 7, different strategies are available. Depending on the expected accident course, and depending on which devices 5, 11, 12, 13, 14 will cooperate with the vehicle deceleration, the reconnection of the separated partial mass 7 can either not take place or take place via at least one elastic impact or via at least one plastic impact or in dependence on a certain path, for example the path of the separated partial mass 7, the path of expected intrusions, the path of relative movements between the vehicle 1 and the environment and possibly the obstacle 8, and the path of occupants. The reconnection of the partial mass in dependence on a certain relative time with regard to for example the start of a crash or with regard to the exceeding of at least one limit value. The dependence on diverse sensors or sensor devices can further be provided. The crash detection device 2 preferably operates with a corresponding crash sensor system, for example distance measuring devices. A surrounding field sensor system, a vehicle sensor system and an occupant data sensor system can further be provided. Resilient and non-resilient accident partners or obstacles 8 can thereby for example be distinguished. For example, another vehicle forms a resilient obstacle 8, while a bridge pillar forms an essentially non-resilient obstacle 8. The occupant parameters are for example the current belt state, the current seat position and the age of the respective occupants.

The reconnection of the partial mass can further be made dependent on values which have been determined before the start of the accident, for example by the crash detection device 2. These values are for example the assumed accident course and assumed trajectories as movement paths.

The above-mentioned different strategies for the reconnection of the partial mass 7 can be realized with either an invariant fixed layout, where the reconnection of the partial mass 7 is always carried out in the same manner or the same separation time of the partial mass 7. Self-controlling systems and actively controllable systems are furthermore conceivable, which enable a variable design and which can for example operate with actuators.

It is obvious that the previously mentioned versions can be combined in a virtually arbitrary manner, as long as these combinations are logically sensible.

Pulses—completely or partially—can for example be transferred to the respective obstacle 8 before or during the case of the crash. An exit of the respective partial mass 7 from the vehicle can—depending on the strategy—be provoked, accepted or avoided. It can be advantageous to design certain vehicle parts (for example the outer skin panel) in a penetrable, displaceable, deformable or the like manner.

With a simple embodiment, a displacement or reconnection of the engine via an elongated hole can for example be provided, which permits a displacement but delimits the maximum value. During the reconnection of the engine, the elongated hole can deform, or existing other components, as for example a vehicle cooler, can be deformed.

The partial mass 7 accelerated with the help of the acceleration device 5 can basically occur in every aggregate form and can also be converted to a different aggregate form if need be. In the case of a crash, at least a part of the cooling fluid of a cooling cycle of the vehicle 1 can be evaporated.

As a special case, mass from the environment of the vehicle 1 can also be used for a repercussion effect, for example air or water. This external mass could be accelerated actively, for example by a inversely rotating radiator fan, or could be accelerated reactively or passively, for example by corresponding baffle or deflection surfaces for air, water or the like. The reconnection could for example also take place externally of the vehicle 1 according to the principles described above.

The present invention mainly operates with the influencing of the vehicle pulse. This can be in a much more variable manner with the suggested approach than is possible with previous passive measures. According to the invention, the occupant load is reduced with the help of the suggested approach, wherein the deceleration characteristic can additionally be designed in a comparable variable manner. Amongst the vehicle slacks, a crush zone which is designed too soft for heavy accidents can be subsumed, which is for example provided for lighter collisions. So-called crash boxes are especially amongst these, which shall increase the repairability of small accidents. The function of the restraint system can thereby be viewed in a rather general and abstract manner.

The achievement of a deceleration course of the vehicle 1 in the case of a crash that is a homogenous and low as possible is a principal aim of the present invention, whereby the restraint system can operate as optimally as possible. It can thereby be advantageous if the vehicle pulse is adjusted to special properties or requirements of the restraint system, as for example to the belt slack already mentioned above. An adaptation to certain properties or requirements of the occupants, for example the current belt state, to the load or the like is further also conceivable.

The initial deceleration process, which is often below the maximum deceleration with conventional vehicles, can for example be increased, in order to decrease it in the period during which the occupants are decelerated the most by the restraint system, thus are bound the most to the vehicle. As a result, the occupants can be decelerated earlier, and their maximum loads can be reduced. The crash impulse can thereby also be adapted to the effective region of the restraint system and especially widen this. The crash impulse and the restraint system can further be adapted to each other in such a manner that an optimal occupant deceleration results therefrom. This is the virtually rectangular deceleration characteristic which has already been discussed above, which can possibly have edges which ascend in a less steep manner or in a soft or round manner if this leads to lower probabilities of injuries, due to for example a less abrupt deceleration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle comprising:
   a crash detection device for detection of a crash that introduces a force into the vehicle acting in an effective direction;
   at least one partial mass disposed in the vehicle and located outside of an occupant compartment of the vehicle; and
   an acceleration device that cooperates directly or indirectly with the crash detection device in the case of a crash, against the effective direction of the force introduction, for effecting an absolute acceleration of the at least one partial mass in the vehicle.

2. The vehicle according to claim 1, further comprising a holding device that cooperates directly or indirectly with the crash detection device for fixing the partial mass relative to a remaining portion of the vehicle during a normal vehicle operation, and releasing the partial mass relative to the vehicle in the case of a crash.

3. The vehicle according to claim 1, further comprising an absorption device for braking the partial mass that is accelerated relative to the remaining portion of the vehicle in the case of a crash.

4. The vehicle according to claim 1, further comprising a force transfer device for transferring a force from the moved partial mass to a remaining portion of the vehicle.

5. The vehicle according to claim 1, wherein:
   the crash detection device is designed for detecting different forces acting in effective directions; and
   the acceleration device for accelerating the respective partial mass is designed to accelerate the respective partial mass in different directions.

6. The vehicle according to claim 1, wherein:
   the crash detection device is designed to detect the magnitude of the force introduced into the vehicle in the case of a crash; and
   the acceleration device is designed to generate accelerations of the partial mass having different magnitudes.

7. The vehicle according to claim 1, wherein:
   the crash detection device is designed to detect the magnitude of the force introduced into the vehicle in the case of a crash; and
   a control activates at least one of the acceleration device, a holding device, an absorption device, a counter acceleration device, and the force transfer device dependent upon the magnitude of the introduced force.

8. The vehicle according to claim 1, wherein:
   the acceleration device has at least one passive drive device in the form of one of a tensioned mechanical or pneumatic spring, a lever and a deflection device; and
   the acceleration device has at least one active drive device in the form of one of an electrical, electromagnetic, hydraulic, pneumatic and pyrotechnical actuator.

9. The vehicle according to claim 1, wherein the at least one partial mass comprises an engine, battery, tank of the vehicle, body shell part, or displaceable mass in a longitudinal beam.

10. A vehicle comprising:
    a crash detection device for detection of a crash that introduces a force into the vehicle acting in an effective direction;
    at least one partial mass disposed in the vehicle;
    an acceleration device that cooperates directly or indirectly with the crash detection device in the case of a crash, against the effective direction of the force introduction, for effecting an absolute acceleration of the at least one partial mass vehicle; and
    a counter acceleration device for accelerating the partial mass in an opposite direction following an acceleration by the acceleration device.

11. The vehicle according to claim 10, further comprising a force transfer device for transferring a force from the moved partial mass to a remaining portion of the vehicle.

12. The vehicle according to claim 10, wherein:
    the crash detection device is designed for detecting different forces acting in effective directions; and
    the acceleration device for accelerating the respective partial mass is designed to accelerate the respective partial mass in different directions.

13. The vehicle according to claim 10, wherein:
    the crash detection device is designed to detect the magnitude of the force introduced into the vehicle in the case of a crash; and
    the acceleration device is designed to generate accelerations of the partial mass having different magnitudes.

14. The vehicle according to claim 10, wherein:
    the crash detection device is designed to detect the magnitude of the force introduced into the vehicle in the case of a crash; and
    a control activates at least one of the acceleration device, a holding device, an absorption device, a counter acceleration device, and the force transfer device dependent upon the magnitude of the introduced force.

15. The vehicle according to claim 10, wherein the at least one partial mass comprises an engine, battery, tank of the vehicle, body shell part, or displaceable mass in a longitudinal beam.

16. A method for reducing loading of a vehicle occupant in the case of a crash, said method comprising:

in the case of a crash first accelerating, by an acceleration device, a partial mass of the vehicle absolutely in a direction opposite to an expected force introduction direction due to the crash, and second accelerating, by a counter acceleration device, the partial mass in the direction of the expected force introduction direction.

* * * * *